April 5, 1938.  I. JEPPSSON  2,113,025
MIXER DRIVE MECHANISM
Filed March 29, 1935
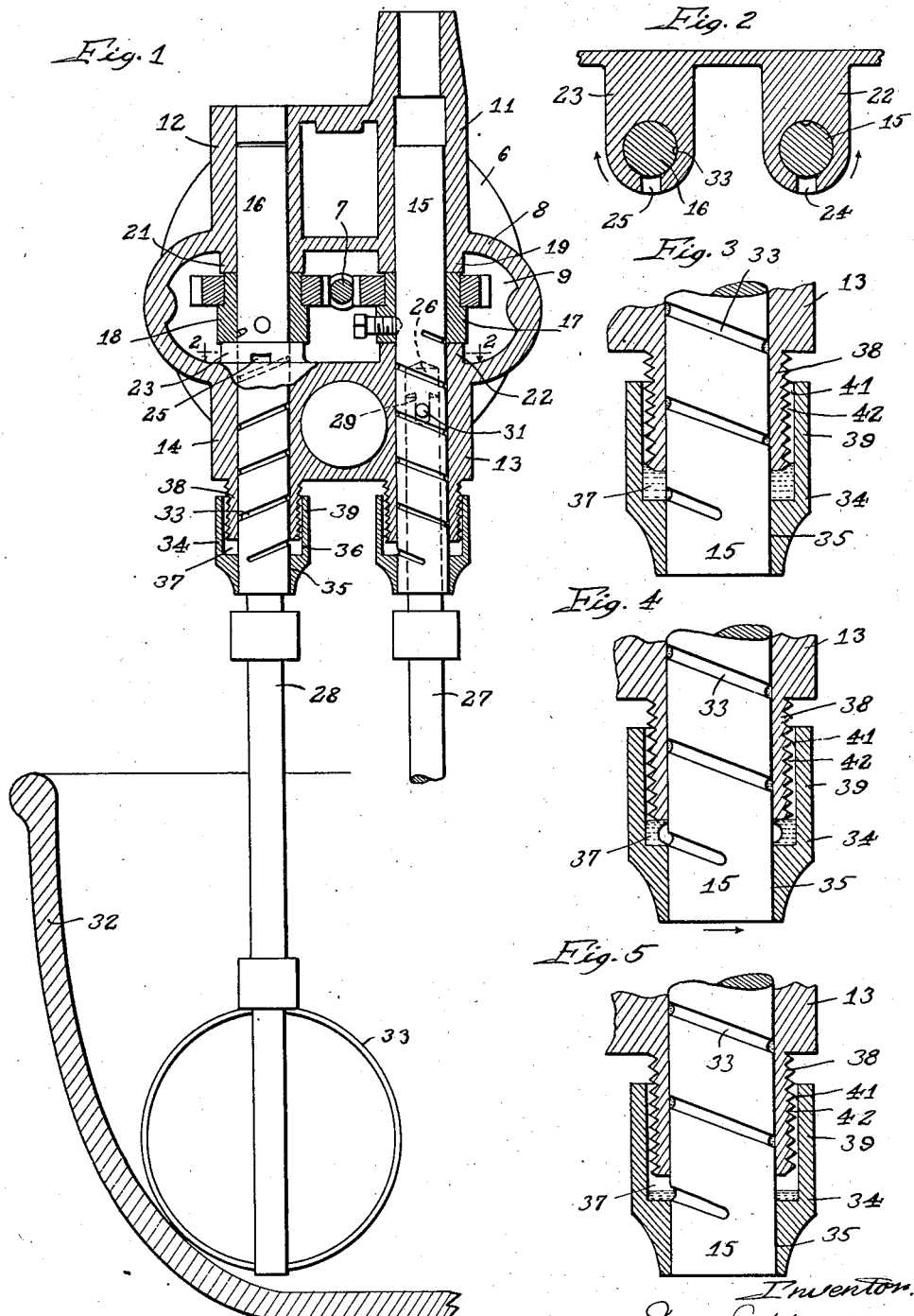
Inventor:
Ivar Jeppsson
By
Wilson, Powell, McCanna & Wintercorn
Attys.

Patented Apr. 5, 1938

2,113,025

UNITED STATES PATENT OFFICE 2,113,025

MIXER DRIVE MECHANISM

Ivar Jeppsson, Chicago, Ill., assignor to Chicago Flexible Shaft Company, Chicago, Ill., a corporation of Illinois Application March 29, 1935, Serial No. 13,644

5 Claims. (Cl. 308—36.1)

This invention relates to household mixers and has special reference to improved drive mechanism therefor, effective in lubricating the spindle bearings and in retaining the lubricant within the drive structure.

The common type of household mixer is so constructed as to have one or more vertically disposed beater shafts or spindles carried in vertically disposed bearings. A major problem arises in providing proper lubrication for these bearings and yet preventing the lubricant from working out along the lower end of the bearing and following down the beater shafts into the food. These mixers are commonly provided with a stuffing box at the lower end of the bearings but this means is only partially effective to accomplish its purpose. The stuffing boxes need frequent adjustment and even when carefully adjusted are not entirely satisfactory. After the mixers have been in service a short time, an opening develops between the stuffing box and the spindle, allowing the escape of a small amount of lubricant. The stuffing box must then be tightened up so as to force the packing against the surface of the spindle. When the packing is forced against the spindle with sufficient tightness to prevent the escape of lubricant, a considerable drag is interposed on the spindle, placing an additional load on the mixer motor, which, without this additional drag, is none too large to handle its peak loads. Furthermore, the packing becomes saturated with lubricant, rendering still more difficult the problem of retaining the lubricant at the end of the bearing. Because of these and other difficulties, the problem of providing a satisfactory and efficient drive for the mixers has been a difficult one, for which, to the best of my knowledge, there has heretofore been no satisfactory solution.

A primary object of this invention is the provision of a household mixer having improved spindle and bearing construction wherein the lubricant is distributed over the bearing surface during the operation thereof.

I have aimed to provide a household mixer having improved means for lubricating the spindles thereof and for retaining the lubricant in the bearing.

Another object of the invention is the provision of a vertically disposed spindle and bearing construction having means for retaining the lubricant within the bearing structure, which means interposes substantially no drag or load on the drive.

A further object of the invention is the provision of a mixer wherein the lubricant from the spindle bearings, is positively prevented from emerging from the bearing structure.

I have also aimed to provide a bearing and spindle structure especially suited to mixers having a vertically disposed shaft arranged for intermittent operation wherein the flow of lubricant from the bearing is received and retained at the lower end of the bearing, and the bearing and spindle are shaped to return the lubricant through the bearing and distribute the same over the bearing surface during the operation of the mixer.

Other objects and attendant advantages will become apparent to those skilled in the art from the following description and the accompanying drawing, in which—

Figure 1 is a vertical section through the bearings of a mixer embodying my invention;

Fig. 2 is a section on the line 2—2 of Figure 1, and

Figs. 3, 4 and 5 are fragmentary sections taken longitudinally through the lower end of the spindle bearings and the oil retaining cups illustrating the manner of operation of the drive mechanism.

Referring first to Figure 1, the invention is shown as embodied in a well known type of mixer having a motor casing 6 enclosing an electric motor arranged to drive a worm 7. The forward end of the casing 6 carries a gear housing designated generally by the numeral 8 having a chamber 9 which acts as a gear chamber and lubricant reservoir. The housing 8 has upwardly extending bearings 11 and 12 and depending bearings 13 and 14 which open into the chamber 9 and serve to receive spindles 15 and 16 which project downward beyond the ends of the bearings 13 and 14. Gears 17 and 18 are positioned within the chamber 9 and attached to the spindles 15 and 16 in position to be engaged and driven from the worm 7. The upper bearings project downward into the chamber, as shown at 19 and 21, to provide top bearing surfaces for the gears 17 and 18, and likewise the bearings 13 and 14 project upward, as shown at 22 and 23, to provide a lower bearing for the gears, thus supporting the gears at an intermediate point in the chamber 9. The portions 22 and 23 of the bearings 13 and 14 have openings, as shown at 24 and 25, for the passage of lubricant from the reservoir 9 into and out of the bearings 13 and 14 in a manner presently to be more fully described. The spindles 15 and 16 are provided at their lower end with sockets 26, as shown in dotted lines, for the reception of beater shafts 27 and 28, the upper ends of the beater shafts having slots 29 for the reception of pins 31 extending across the sockets 26 to establish driving relation between the spindles and the shafts. The beater shafts 27 and 28 project downwardly into a mixer bowl 32, the beater shafts carrying beaters 33 at their lower ends for agitation of the contents of the bowl 32.

The chamber 9 acts as a reservoir for lubricant to lubricate the contacts between the worm gears 17 and 18 and the worm 7, and also to lubricate the bearing surfaces between the gears and their supporting elements. The lubricant from the chamber 9 also acts to lubricate the surfaces between the bearings 13 and 14 and the spindles 15 and 16, the lubricant passing through the openings 24 and 25 and working downward along the spindles. The invention is particularly concerned with lubrication of these spindles and their supporting bearings and with the retaining of the lubricant within the bearings so that it does not pass downward along the beater shafts 27 and 28 and into the food being mixed in the bowl 32, which action is objectionable in that it contaminates the food and diminishes the supply of lubricant in the chamber 9. To the end of preventing the loss of lubricant and providing improved lubrication for the spindles, I have provided a groove 33 on each of the spindles helically arranged thereon and extending from within the chamber 9 to a point below the bearing. This groove is pitched in a direction opposite that of the spindle rotation, as indicated by the arrows in the several figures. At the lower end of each of the spindles is provided a cup designated generally by the numeral 34 which has a press fit at its lower end on the spindle, as shown at 35. The upper portion of the cup has a counterbore 36 providing a well 37 adjacent the spindle and below the lower end of the bearing. The lower end of the bearing is provided with a collar 38, in this instance, integral with the body of the bearing structure, though not necessarily so. This collar preferably has a cylindrical outer surface and is adapted to be received within the cylindrical walls 39 of the well 37, as best shown in Figs. 3–5, so as to provide a relatively long band longitudinally of the bearing in which the walls 39 telescope over the collar 38. These parts should be of such size as to provide a relatively narrow annular space between the walls 39 and the collar 38, as shown at 41. While the collar 38 may have a smooth outer surface, I have found it advantageous to provide threads, as shown at 42, on the outer surface of the collar, for a purpose presently to be described.

In the operation of the mixer, the chamber 9 is partially filled with lubricant. This lubricant is in most cases a semi-liquid material which becomes sufficiently fluid to flow readily when the motor becomes heated. In this heated condition it is thrown about the chamber 9 by the rotation of the parts, and thus serves to lubricate the various bearing surfaces. The lubricant also tends to pass through the openings 24 and 25 and creep downward along the bearing surfaces between the bearings and the spindles. When the motor is stopped after a run, it will normally have heated the casing sufficiently to render at least a part of the lubricant fluid so that it will pass through the openings 24 and 25 into the grooves 33 on the spindles. It will pass down these grooves into the wells 37 of the cups 34, partially or wholly filling the wells 37, and in some instances creeping up a short distance in the space between the collar 38 and the wall 39 of the cup. The space between the collar and the wall is such as to prevent the lubricant from rising in a substantial amount within this space. I have found that even upon using the lightest machine oil the lubricant will not rise more than one or two threads along the collar 38. The forces on the lubricant in the well and in the reservoir then appear to become balanced and the lubricant remains substantially in this condition until the mixer is again started. Thereupon the spindles are rotated in such a direction that the helical grooves cut into the lubricant in the well 37, as shown in Fig. 4, thereby elevating the lubricant formerly resting in the grooves and also a large part of the lubricant which has been deposited in the well 37. A certain part of this lubricant will be thrown out against the annular walls of the well since the cup 34 rotates with the spindle. However, this lubricant does not creep up along the walls but remains in the well assuming the position shown in Fig. 5 when the motor is again stopped. Thereupon lubricant again begins to creep downward into the well, as previously described.

It will be noted that whenever the mixer is started, causing the spindles to rotate in their respective directions, lubricant is carried upward along the bearing surfaces of the bearings 13 and 14, thereby lubricating the bearing surfaces. It will be seen that this bearing construction, therefore, provides positive lubrication to the bearing surfaces immediately upon the starting of the motor so that the lubrication of these surfaces is not left to chance, as in prior constructions. It will further be noted that packing between the spindle and the bearing has been entirely eliminated, and the spindle rotates freely in its bearing without the customary load due to stuffing boxes. It will also be observed that the cups serve to prevent the leakage of oil from the lower end of the bearing, and act to retain the same for return to the chamber and lubricant reservoir 9 upon the next succeeding operation of the mixer and simultaneously to lubricate the bearing.

While I have thus described and illustrated a specific embodiment of my invention, numerous alterations and modifications of the structure may be made for the accomplishment of substantially the same result and embodying the same principles and inventive concept, and I therefore do not desire to be limited to the specific construction disclosed except as required by the prior art and the scope of the appended claims, in which I claim:

1. The combination in a power transmitting mechanism of a vertically disposed spindle, a bearing providing support for said spindle and having a cylindrical lower end, the spindle extending below the bearing, and a cup surrounding the spindle below the bearing, the spindle closing the lower end thereof, the upper end of the cup being annularly spaced from the spindle for the reception of the cylindrical lower end of said bearing in a relatively wide telescoping band in which the outer surface of the bearing and the inner surface of said cup are in close proximity to prevent the passage of lubricant therebetween under the pressure of the lubricant in the reservoir when the spindle is stopped, said spindle having a helically disposed groove serving as the sole means for the free passage of lubricant from the bearing into said cup when the spindle is stationary and acting to elevate the lubricant from the cup upon rotation of the spindle.

2. The combination in a food mixer of a vertically disposed rotatable spindle, a stationary bearing providing support for said spindle and having a cylindrical lower end, the spindle extending below the bearing, and a cup surrounding the spindle, the spindle closing the lower end thereof, the upper end of the cup being annularly spaced from the spindle for the reception of the cylindrical lower end of said bearing in close proximity to the inner surface of the cup through a relatively wide area, said spindle having a helically disposed groove for the passage of lubricant from the bearing into said cup when the spindle is stationary and acting to elevate the lubricant from the cup upon rotation of the spindle, the said cylindrical portion of the bearing having a plurality of longitudinally spaced annular grooves on its outer surface tending to prevent overflow of lubricant from the cup by preventing upward passage of lubricant between the cup and the bearing.

3. The combination in a food mixer of a vertically disposed spindle, a bearing on the spindle for supporting the same, said spindle having a helical groove extending above and below the bearing, a cup surrounding the spindle below the bearing, and a gear chamber receiving the spindle for supplying lubricant to the upper end of the spindle in quantity greater than the capacity of said cup, said cup and bearing having relatively wide complementary surfaces in capillary proximity whereby to prevent the escape of lubricant therebetween, and means for rotating the spindle whereby the helical groove acts to elevate lubricant from the cup upward through the bearing.

4. The combination in a food mixer of a gear casing having a gear and lubricant chamber containing a relatively large quantity of lubricant, a bearing depending vertically from said casing and intersecting said chamber for the reception of lubricant therefrom, a depending spindle supported in said bearing and projecting into said casing, means within the casing for driving said spindle, said spindle having a helical groove sloping in a direction opposite to the direction of rotation thereof, a sleeve surrounding said spindle below said bearing forming a cup and providing a well of relatively small capacity for the reception of lubricant from the bearing, and complemental means on the sleeve and the casing providing vertically positioned, closely spaced annular, relatively wide surfaces extending longitudinally of the spindle to prevent the escape of lubricant from the cup.

5. The combination in a motor driven household mixer having a unitary motor and gear casing adapted for portable use and a food mixing bowl therebelow, of a spindle journaled in said casing and depending therefrom, gearing in said gear casing for driving said spindle, and means to prevent the drip of lubricant passing along the spindle bearing surface under the pressure of lubricant in said casing comprising a cup carried on the spindle below said casing for catching the leakage along the spindle bearing surface when the spindle is stationary, a boss surrounding said spindle depending from said casing through a wide band and telescoping into said cup, the periphery of said boss being in capillary proximity to the internal wall of said cup for the purpose of preventing the overflow of lubricant from the cup, and a helical groove on the spindle for returning the lubricant to the gear casing when the spindle is rotated.

IVAR JEPPSSON.